United States Patent [19]
Takei

[11] 3,771,154
[45] Nov. 6, 1973

[54] WARNING SYSTEM

[76] Inventor: Masayoshi Takei, No. 6-5, Kita 2-Chome, Kunitachishi, Tokyo, Japan

[22] Filed: Dec. 27, 1971

[21] Appl. No.: 212,063

[30]  Foreign Application Priority Data
Dec. 30, 1970  Japan.............................. 45/127552

[52] U.S. Cl............... 340/275, 340/274, 340/309.1, 200/61.62, 335/205
[51] Int. Cl. .......................................... G08b 21/00
[58] Field of Search................ 340/274, 275, 309.1, 340/309.5, 276; 200/61.62; 355/205

[56]  References Cited
UNITED STATES PATENTS

| | | | |
|---|---|---|---|
| 3,544,987 | 12/1970 | McMann............................ | 340/274 |
| 2,449,738 | 6/1969 | Chesnol............................. | 340/274 |
| 3,531,793 | 9/1970 | Shottenfeld..................... | 340/274 X |
| 3,656,143 | 4/1972 | Smith................................ | 340/274 |

Primary Examiner—John W. Caldwell
Assistant Examiner—William M. Wannisky
Attorney—Frank J. Jordan

[57]  ABSTRACT

A warning system and apparatus includes a circuit for receiving a signal which is indicative of an abnormal condition and a power source for operating and maintaining a circuit to indicate the abnormal condition. A magnetic switch is used in sensing the existance of abnormal conditions. Thus, the magnetic switch serves as a sensor for detecting non-standard or alarm conditions at the site where the warning apparatus is installed.

A transistorized circuit operates to trigger the alarm and also, under certain circumstances, to delay the alarm signal during a predetermined time interval after the magnetic switch is actuated to avoid undesired indications or false alarm. Also, the system operates to maintain the alarm even after the abnormal condition which set off the alarm has returned to its normal state.

1 Claim, 9 Drawing Figures

INVENTOR
MASAYOSHI TAKEI

BY Frank J. Jordan
ATTORNEY

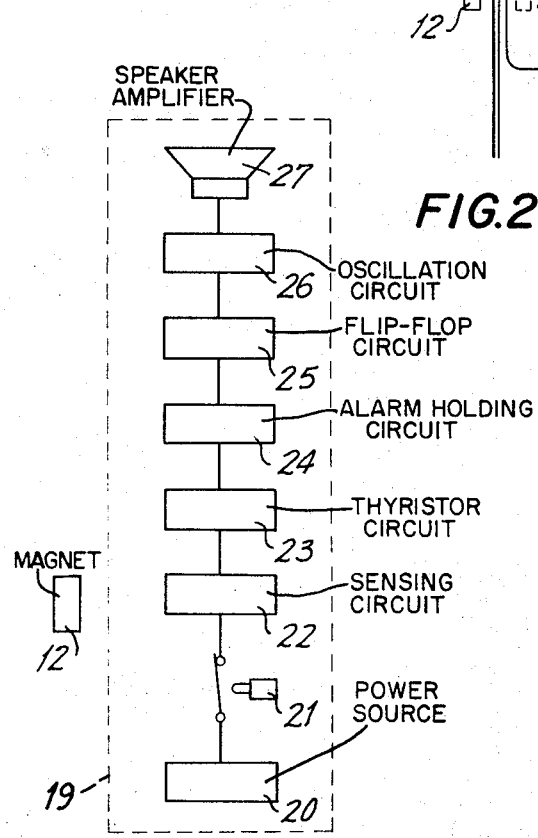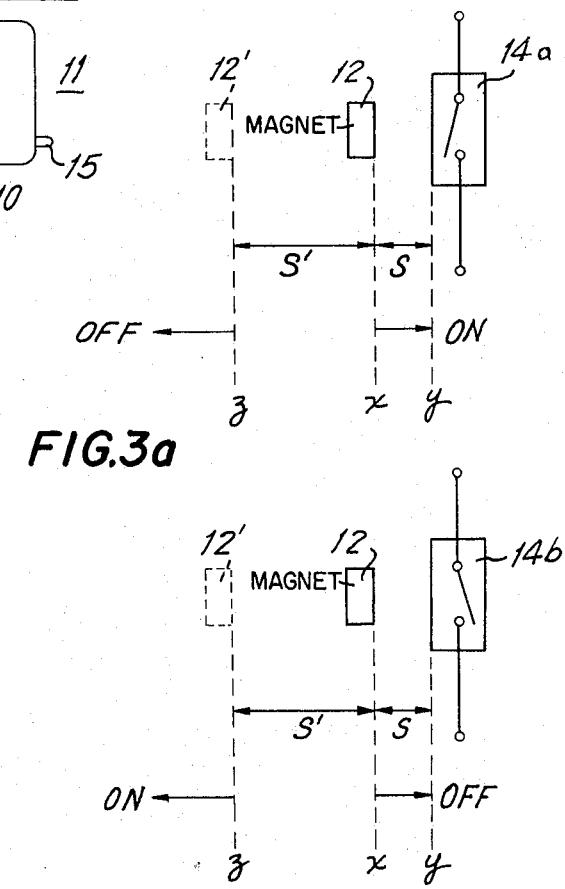

WARNING SYSTEM

BACKGROUND OF THE INVENTION

The present invention relates generally to a warning or alarm apparatus and device as used for example in buildings, warehouses, cars, showcases, and the like locations where it is desirable to provide a warning condition of an abnormal condition therein. The condition to be detected may be to indicate the opening and closing of a door, to indicate damage, or to monitor a member, equipment, machine or the like.

In conventional warning systems used to indicate intrusion or opening of a door or window, there has been utilized relatively large and extensive equipment and systems such as invisible energy detection systems which include ultrasonic or infrared devices. Other conventional warning or alarming devices utilize a microswitch for sensing the opening of a door and the like events. However, these devices are too complicated and are not always practical to install as ordinary appliances in many situations. Frequently erroneous operation and interruption of such devices are caused by dirt and dust, corrosive gases, humidity, vibration, mechanical shocks, and the like. Such disadvantages are difficult or impossible to avoid in these conventional devices. In addition such devices when installed are usually readily accessable so that it is a relatively simple matter to examine its internal construction thereby making it easier for outsiders to tamper with the devices to impair and destroy their effectiveness.

According to the present invention, in order to provide for operability and sensitivity of the device in detecting anomalous conditions which might produce a false alarm, "make" and "break" signals by the magnetic switch are distinguished from other true alarm conditions. For example for given periods of time during each sensing interval, provision is made so that false alarms are avoided and a correct indication of the abnormal condition is indicated.

SUMMARY OF THE INVENTION

The present invention relates to a warning apparatus and device to indicate a predetermined abnormal condition and which does not require the use of an extensive array and complicated arrangement of elements and which functions and operates trouble free without being subjected to operating difficulties heretofore experience with known prior art devices.

In the illustrated embodiment of the invention, a magnetic switch is moved to a position which effects its actuation and a circuit, which comprises a DC power source and manually operable power switch, functions to form a sensing circuit employing a normally closed or normally open contact type magnetic switch and which functions to provide a signal to set off an alarm. The desired output signal corresponds to an abnormal alarm condition.

An important feature of the invention is the fact that the warning apparatus may be readily, easily, and reliably operated. Also the apparatus may be easily and simply mounted based on the use of a magnet and corresponding magnetic switch. Thus, there is less likelihood of erroneous operation and rapid loss from the DC source power. The aforesaid advantages of the present invention are achieved in one embodiment of the invention by utilizing a delaying capacitor in the sensing circuit, which precludes setting off the alarm during a predetermined period of time, a silicone controlled rectifier (Thyristor, SCR) which is triggered only when an abnormal condition is sensed by the magnetic switch and then which maintains the alarm in operation, a flip-flop circuit to generate an intermittant output from the current flowing through the thyristor, an oscillation circuit and a speaker set. The principles of the invention may be embodied in a more simplified arrangement using a smaller number of elements.

BRIEF DESCRIPTION OF THE DRAWINGS

FIG. 2 is a shematic and fragmentary front view of an apparatus embodying the present invention as mounted on a door and door frame.

FIGS. 3a and 3b are schematic views illustrating respectively the operation of a normally closed and a normally open contact type magnetic-switch according to the present invention.

FIG. 4 is a block diagram schematically illustrating an overall view of the components and structure of the present invention.

DESCRIPTION OF THE PREFERRED EMBODIMENT

Figure 1A:
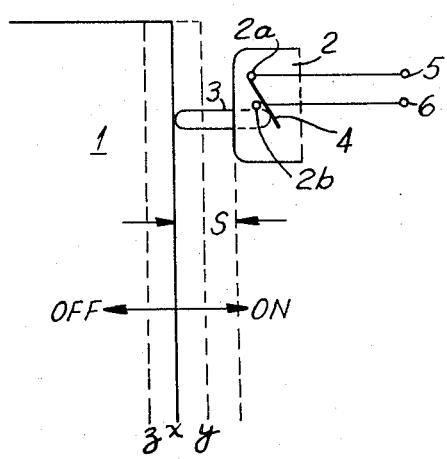
FIGS. 1a and 1b are schematic views of a conventional normally closed and a normally open contact type switch respectively.

Referring now to FIG. 1a, there is shown in conventional spring operated switch 2 (for example a microswitch) of the normally closed type as used in a conventional alarm or warning circuit. When a movable member, such as a door 1, is moved from position $x$ to $y$, lever or pin 3 on switch 2 which is normally biased to maintain the connector 4 in position to make a connection between terminals $2a$–$2b$, is moved to the right to open the connection between terminals $2a$ –$2b$ of the spring switch 2. The stroke or distance of movement S of pin or lever 3 is limited to the length of its movable extension in producing a detecting signal relating to an abnormal condition occurring within the relatively narrow distance S, the latter also being the distance between the door 1 in its normal position and the side wall of the switch 2 which is mounted on the fixed door frame. In a circuit employing a normally closed switch as above in which the position $x$ is located on the side of position y and where the connection in the switch 2 is broken when the door is moved to position $x$, current flow through the warning circuit (not shown) is obtained because the warning circuit is connected with a source of power (not shown).

Figure 1B:
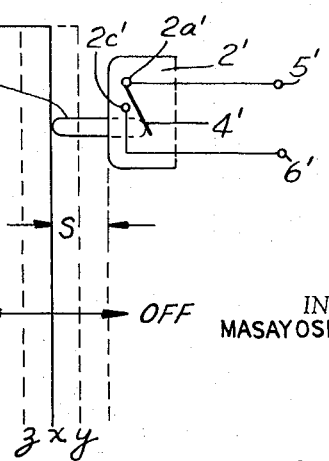

In a conventional system employing a normally open contact type spring switch 2' as shown in FIG. 1b, connection between connector 4' and terminal $2c'$ could not be made until the door 1' is moved from position $x$ to the position $z$ so as to indicate an abnormal condition and thereby produce a sensing signal in the terminals 5', 6'. Connection of the warning circuit (not shown) with the power supply (not shown) is accomplished in the "make" state of the contact 4' in the circuit.

As seen in FIG. 2 an alarm which incorporates the principles of the present invention comprises a body 10 mounted on a door frame 11 and a magnet 12 correspondingly mounted on a door 13. The housing of body 10 may be formed of non-magnetic materials such as aluminum, glass, and synthetic resines, so that the distance between magnet 12 and the sidewall of the body 10 may be limited to approximately a few centimeters in width according to the magnetic force of the magnet 12 and the magnetic sensitivity of a switch 14 within the body 10.

A manually operated switch 15 is adapted to made a connection with a source and is initially in the OFF-state when pushed into the body 10, while it will be switched to the ON-state from the OFF-state by manually pulling out the switch 15 as will be hereinafter set forth. Switching the power source to ON by pulling out the switch 15 and separating the door 13 from the magnetic switch 14 until the distance S between the switch 14 and magnet 12 exceeds a given maximum value, enables the warning circuit to be activated, such activation being controlled by the cooperative effort of switch 14 and magnet 12. At the condition illustrated in FIG. 3a wherein a normally closed contact switch is employed, movement of magnet 12 through distance S' from the solid line to the broken line position as indicated at 12' causes the switch 14a to open and to connect the power source to the warning or alarm circuit. Alternatively, in the case of a normally open contact type switch as shown in FIG. 3b, the switch 14b is closed by moving magnet 12 through the distance S' from the solid line to the broken line position indicated at 12'. The latter occurs when an abnormal condition or position of the door 13 is obtained.

FIG. 4 is a schematic diagram of one embodiment of the invention in which the various components are included in a housing 19. The components include an electric power source 20, contacts for a manually operated switch 21, a magnetic switch type sensing section 22 providing a normally open or closed contact arrangement, an alarm holding circuit 24, a flip-flop circuit 25, an oscillation circuit 26, and a speaker-amplifier 27.

The magnet 12 is located adjacent to the sensing section 22 and to the manually operable switch 21.

Figure 5:
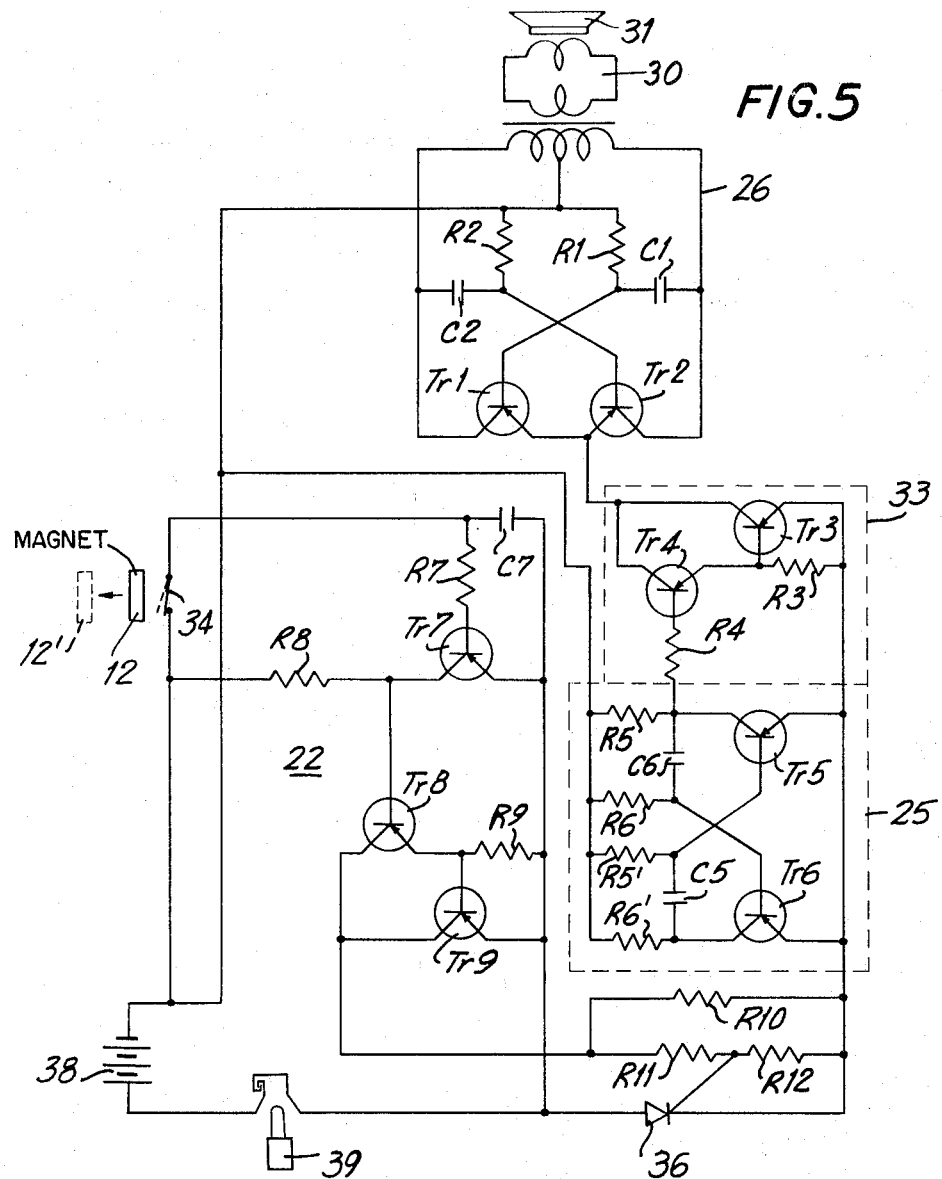
FIG. 5 is a wiring diagram showing the details of the various components shown in FIG. 4 and wherein the sensing circuit employs a normally closed contact type switch.

Referring to FIG. 5, the oscillating circuit 26 (astable multivibrator circuit) comprises transistors Tr1, Tr2, capacitors C1, C2 and resistors R1, R2. The oscillating circuit 26 functions to intermittantly deliver the output to transformer 30 and in turn to speaker 31 in the secondary circuit.

Transistors Tr3 and Tr4 and resistors R3, R4 constitute a circuit 33 for amplifying the current output from the flip-flop circuit 25, the latter including transistors Tr5, Tr6, resistors R5, R6, capacitors C5, C6 and resistors R5'R6'. The circuit 22 for sensing the operation of the magnetic switch 34 comprises transistors Tr7, Tr8, Tr9, resistors R7, R8, R9, and capacitor C7 which perform and function in a manner as will hereinafter be described.

In a sensing circuit employing a normally closed contact type switch, as employed in FIG. 5, separation between the magnetic switch 34 and the magnet 12 effects a "break" in the former upon reaching a given distance of separation. When the warning device is installed or mounted on a door, opening of the door a small amount results in setting off of the warning or alarm device. The alarm is sustained due to triggering of a silicone controlled rectifier or thyristor 36. To control the current flow through the thyristor 36 and to restrict an excessive current flow thereto, resistors R10, R11 and R12, are provided in the thyristor circuit 23. Thus, the thyristor 36 functions to maintain the current flowing through the circuit after the magnetic switch 34 initiates operation so that the current passing through the flip-flop circuit 25, oscillation circuit 26, and the alarm is continued to be supplied from the source 38, even though an intruder may have immediately shut the door so as to make or close the magnetic switch 34 in turn to change the conduction of the transistors Tr8 and Tr9 to a non-conductive state.

Since capacitor C7 functions as a delay timer element, that is the capacitor C7 enables the warning circuit in the opening door condition to preclude operation and sounding of the alarm for a given period, for example 5–10 seconds after the door is opened, the user would not be subjected to hearing the alarm during normal use in passing through the door. The fact that the manually operated switch 39 may be left in an "ON" position, that is so that it makes a connection, is an important feature of this invention. Thus by including the built-in delaying action, it is possible for the user to use the door without setting off the alarm provided the user opens and closes the door within the aforementioned given period, for example 5–10 seconds. The delaying action is brought about when the switch 39 is on. Thus with the switch 39 on, if the door is opened, the magnetic switch 34 is energized, and the capacitor C7 becomes charged by taking on an in rush of current for the aforementioned period of 5–10 seconds and thereby prevents triggering of the thyristor 36 during the aforementioned period of time. Thus the charging of the capacitor C7 prevents current from being applied to transistor Tr7 and subsequent triggering of the thyristor 36. As capacitor C7 becomes charged by taking an in rush of current for the aforementioned 5–10 second period, the transistor Tr7 is prevented from being actuated in that current is not applied to the latter. Accordingly, the triggering of the thyristor 39 is precluded during that period of time. After the capacitor C7 has been charged, sufficient base potential is available to actuate transistor Tr7 and thereupon set off the alarm. When transistor Tr9 is actuated, the potential applied to the control gate of the thyristor 39 triggers the latter. After the door is closed within the aforementioned 5–10 second period, the capacitor C7 is discharged and the transistors Tr8 and Tr9 are conductive so that the circuit is ready for operation as soon as the door is opened again.

The device embodying the present ivnention which comprises the circuit elements illustrated in FIG. 5 includes a sensing circuit 22 having a normally closed contact switch 39. The apparatus is mounted in the vicinity of a door on the inside of a door of a room to be monitored. The switch 39 is manually pulled out by the user to set the alarming circuit before going out of the room. The circuit is now set so that the power source 38 is able to supply operating current to the warning circuit. However, the user may open the door momentarily, for example for a 5–10 second period as previously described, so that the user may leave the room without setting off the alarm. When this happens, the capacitor C7 is being charged as previously described. During this period the current flows from the source 38 and in the following sequence: (1) source 38, switch 39, capacitor C7, transistor Tr7, resistor R7, magnetic switch 34, and the source 38. Subsequently, the initiation of discharge from the capacitor C7 causes the current to take another path, that is (2) capacitor C7, emitter of the transistor Tr7, collector of transistor Tr7, resistor R8, source 38, switch 39 and, capacitor C7. The resistor R7 and switch 34 are also included in the path of current flow. When the circuit is operating as above, resistors R7, R8 sufficiently restrict and consume the power to protect the transistor Tr7.

Upon opening the door the magnet 12 mounted on, the door moves to the broken line position indicated at 12' in FIG. 5, to open the contact on the magnetic switch. When this occurs, current flows as follows: (3) source 38, emitter of transistor Tr9, collector of the latter, and the control electrode of thyristor 36. Thus the thyristor 36 is triggered. The current flowing into the control electrode of thyristor 36 is sufficiently restricted by means of resistors R10, R11, and R12. Current then flows to actuate an alarm such as a bell or buzzer through the following path (4): thyristor 36, flip-flop circuit 25 and amplifier section 33, oscillation circuit 26, output transformer 30, and speaker 31. The thyristor 36 is continously operable as long as the aforementioned current flow path (4) is maintained, causing the flip-flop circuit 25 and oscillation circuit 26 to maintain a continuous alarm. The alarm is maintained, even though the door is closed by the intruder. After the door is closed as aforesaid, the current takes the following path (5): source 38, switch 39, resistor R9, emitter of transistor Tr8, collector of transistor Tr8 and Tr9, resistor R 11, control electrode of thyristor 36, cathode of the latter, flip-flop circuit 25, amplifier section 33, oscillation circuit 26, output transformer 30, and speaker 31.

Figure 6:
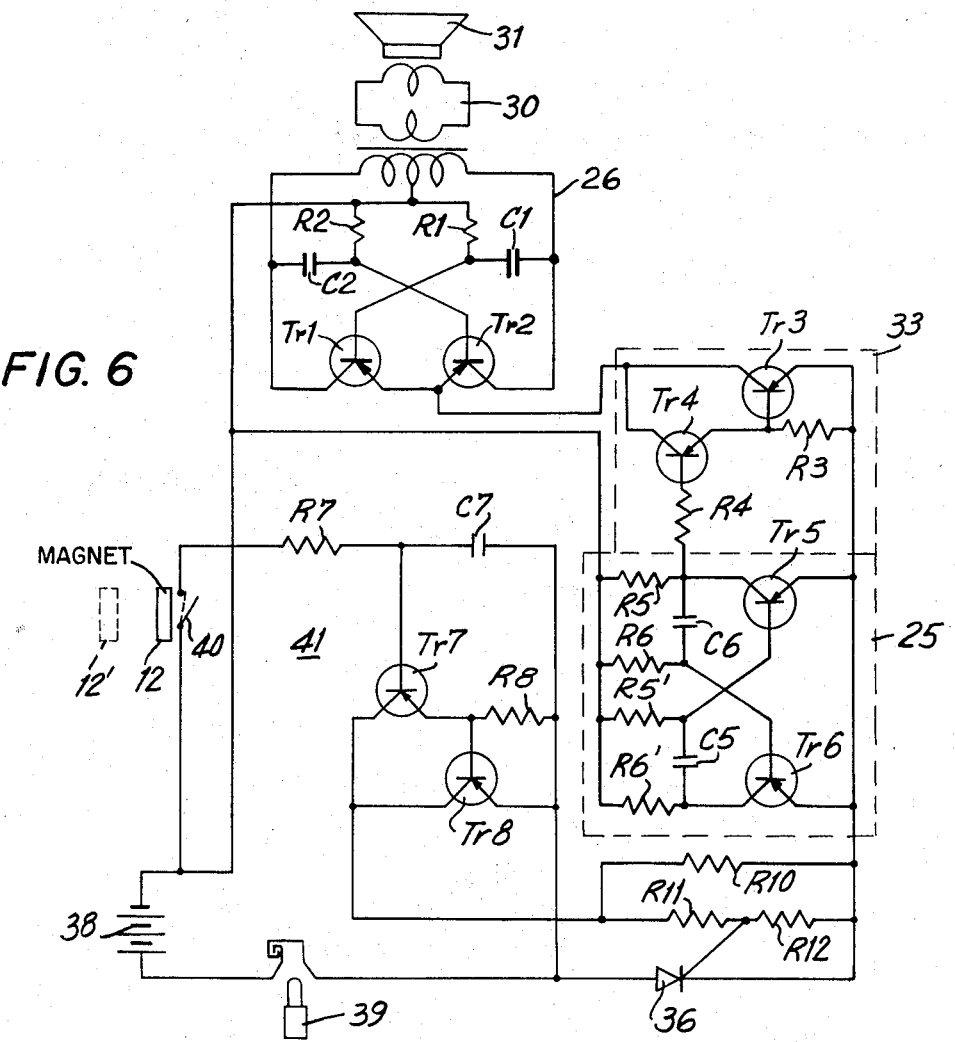
FIG. 6 is a view similar to FIG. 5 but wherein the sensing circuit employs a normally open contact type switch.

Another embodiment of the invention is shown in FIG. 6. The arrangement in FIG. 6 is substantially the same as in FIG. 5 which as previously described employs a normally closed contact switch in the sensing circuit 22 except that one of the transistors and resistors are omitted because of the opposite manner of activating the alarm circuit with the magnetic switch, that is, a normally open contact switch 40 is employed in the sensing circuit 41. This, the embodiment of FIG. 6 includes capacitor C7 an resistor R7 in the sensing circuit which includes the magnetic switch. However, the resistor for the base of transistor Tr7 is omitted. The thyristor is triggered as heretofore when the magnetic switch is actuated. The circuit in FIG. 6 consumes less power than the circuit shown in FIG. 5 because the power consuption is limited in those instances when sensing the heretofore described anomalous conditions in the warning system.

Figure 7:
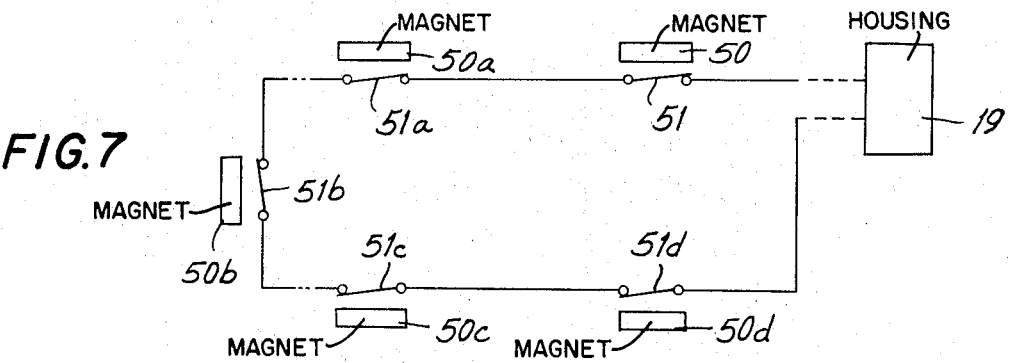
FIG. 7 is a schematic representation of a sensing circuit in which a plurality of sensing switches are disposed in series.

FIG. 7 shows a warning network employing normally closed contact switches in the sensing circuit and which connects any desired number of sensing devices in series and includes a plurality of magnets 50, 50a, 50b, 50c, 50d and a plurality of magnetic switches 51, 51a, 51b, 51c, 51d. If any one of the switches 51, 51a, 51b, 51c, 51d is activated by an intruder, the circuit will be broken and the warning alarm will be triggered a previously described.

It has been found in experimenting and using the apparatus or device embodying the present invention, that it is possible to attain high sensitively in indicating anomalous conditions in the system and that this may be accomplished by using apparatus and equipment where the resulting resistance of the wiring used and the contact portions of the switch have the range within 10 to 100 kilo-ohms and while using a small capacity battery as the source. This enables the warning circuit to extend and to be effective over large and extended areas, that is the wires in the sensing circuit may be extended beyond a hundred kilometers in length. The present invention is adapted for mass production thereby to produce transistorized warning sets which have minimum power requirements, which have long life, and which are not readily subject to adverse malfunctioning due to vibration, humidity, and corrosive gases.

Although the present invention has been described as relating to a transistorized warning or alarming system and apparatus, it is equally well adapted to being embodied in an itegrated circuit in which a substantial number of the circuits are made up of integrated or hybridated elements. Thus, in FIG. 4 the sensing circuit, delaying capacitor, amplifier and flip-flop circuit and like elements may be integrated to attain the desired advantage of reducing the weight, size, and cost of the apparatus.

Since many changes may be made in the above-mentioned construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A warning system for emitting a warning signal upon change in position of an actuating member, comprising a sensing circuit in which a magnetic switch means and a capacitor means is included, said magnetic switch means being operable in response to a change in position of said actuating member to activate said sensing circuit, said capacitor means being charged during initial activation of said sensing circuit, a thyristor means triggered by said sensing curcuit to provide a signal after a predetermined period measured from the time said sensing circuit is activated by said change in position of said actuating member to the time said capacitor means becomes charged, said sensing circuit further including a first transistor with base-emitter circuit connected in parallel with said capacitor means, a second transistor with a base connected to the collector of said first transistor and a third transistor with collector connected to the gate of said thyristor means, the emitter of said third transistor being connected to the anode of said thyristor means, a flip-flop circuit responsive to the signal produced by said thyristor means and operable to provide an alarm signal, and alarm means receiving said alarm signal, said thyristor means being operable to sustain its signal and provide actuation of said alarm means even though said actuating member has returned to its initial position.

* * * * *